United States Patent
Chopra et al.

(10) Patent No.: US 9,830,228 B1
(45) Date of Patent: Nov. 28, 2017

(54) INTELLIGENT BACKUP MODEL FOR SNAPSHOTS

(71) Applicant: EMC IP Holding Company LLC, Hopkinton, MA (US)

(72) Inventors: Shelesh Chopra, Bangalore (IN); John Rokicki, Hopkinton, MA (US); Vladimir Mandic, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 21 days.

(21) Appl. No.: 14/872,233

(22) Filed: Oct. 1, 2015

(51) Int. Cl.
*G06F 11/14* (2006.01)

(52) U.S. Cl.
CPC ...... *G06F 11/1451* (2013.01); *G06F 11/1471* (2013.01); *G06F 2201/84* (2013.01)

(58) Field of Classification Search
USPC .......................................... 714/6.3
See application file for complete search history.

(56) References Cited

U.S. PATENT DOCUMENTS

| | | | |
|---|---|---|---|
| 6,735,701 B1* | 5/2004 | Jacobson | H04L 29/06 726/1 |
| 7,941,459 B1* | 5/2011 | Erickson | G06F 11/1453 707/626 |
| 8,140,480 B1* | 3/2012 | Tsaur | G06F 11/1464 707/648 |
| 8,285,967 B1* | 10/2012 | Veeraswamy | G06F 17/30091 707/821 |
| 9,069,482 B1* | 6/2015 | Chopra | G06F 3/065 |
| 9,164,691 B1* | 10/2015 | Chopra | G06F 3/065 |
| 9,239,840 B1* | 1/2016 | Acharya | G06F 17/30091 |
| 9,323,760 B1* | 4/2016 | Chopra | G06F 17/30088 |
| 9,355,104 B1* | 5/2016 | Chopra | G06F 11/1458 |
| 9,400,613 B1* | 7/2016 | Chopra | G06F 3/065 |
| 2009/0055606 A1* | 2/2009 | Gallaher | G06F 11/1448 711/162 |
| 2012/0124012 A1* | 5/2012 | Provenzano | G06F 17/30162 707/692 |

* cited by examiner

*Primary Examiner* — Kamini Patel
(74) *Attorney, Agent, or Firm* — Staniford Tomita LLP

(57) ABSTRACT

A discovery is made of an object to be backed up on a storage array of a client. An object mapping is generated that maps the object to a LUN of the storage array where the object is located. The object mapping is stored at a backup server. A snapshot of the storage array is obtained. The object mapping is reviewed to identify on the snapshot the object to be backed up and the object is backed up to a backup storage unit.

15 Claims, 10 Drawing Sheets

| | Copy-on-Write | Redirect-on-Write | Full Clones | XtremIO Snapshots |
|---|---|---|---|---|
| Space-Efficient Data | Yes | Yes | No | Yes + Inline Data Reduction |
| Space-Efficient Metadata | No | No | No | Yes |
| Volumes' and Snapshots' Metadata | Metadata served from disk and memory | Metadata served from disk and memory | Metadata served from disk and memory | Metadata always 100% in-memory |
| Creation Time | Instantaneous | Instantaneous | Long time | Instantaneous |
| Performance Impact on Production | High impact | Moderate impact | No impact after clone is completed | No impact |
| Performance of Snapshots | Degraded | Degraded | Same as production | Same as production |
| Rapid Deletes | No | No | No | Yes |
| Delete Limitations | Limited | Limited | n/a | Can delete any snapshots anywhere in the tree without affecting parents or children. |
| Topology Limitations | Limited | May support snap on snaps | No snap on snap support | Any topology |
| Up-front Space Reservation | Yes | May require space reservation | Yes | No |
| Data Services Limitations | Yes | May limit data services | No | No – full data services available |

FIG. 4

| Client name | Client object | Array | LUN |
|---|---|---|---|
| A | /FS1 | Array ID A | 11 |
| B | Oracle Tablespace X | Array ID B | 111<br>222 |
| C | /FS3 | Array ID C | 1122<br>2222 |
| D | SQL Server YYY | Array ID D | 3333<br>4444<br>5555<br>6666 |

FIG. 5

| Backup time | Backup client name | Backup object | Cataloging Yes/No | Remarks |
|---|---|---|---|---|
| Mon, Sep 14, 2015, 3:00 PM | A | /FS1 | No | Will catalog @ 11:30 PM Friday on Sep 18, 2015 |
| Mon, Sep 14, 2015, 1:15 PM | B | Oracle: Tablespace | No | Will catalog @ 11:45 PM, Friday on Sep 18, 2015 |
| Sun, Sep 13, 2015, 10:15 PM | C | /FS3 | Yes | Cataloged at 10:30 PM, Sun Sep 13, 2015 |

FIG. 6

INTELLIGENT BACKUP MODEL FOR SNAPSHOTS

TECHNICAL FIELD

Embodiments are generally directed to networked-based data backup methods, and more specifically to initiating and cataloging backups.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In today's digital society organizations depend on having ready access to their data. Data, however, can be lost in a variety of ways such as through accidental deletion, data corruption, disasters and catastrophes (e.g., fires or flooding), media failures (e.g., disk crash), computer viruses, and so forth. Thus, it is important to backup data in the event that the data needs to be restored. An organization may have an immense amount of data that is critical to the organization's operation.

A typical backup involves a number of operations including making the appropriate connections to the devices that may be involved in a backup, copying the data from the source to the backup destination, and cataloging the backup. Each of these steps requires a commitment of computing resources. During peak operating times of an organization, computing resources that could otherwise be used to service customer requests and perform other production related activities may instead be diverted to backup tasks. As a result, customers may experience long wait times, timeouts, and so forth.

Snapshots provide a very efficient mechanism for performing backups. Snapshots are instantaneous or near instantaneous copy images of volume data, capturing the data exactly as it appeared at the specific point in time when the snapshot was created. Snapshots enable users to save the volume data state, and then access the specific volume data at a later time, including after the source volume has changed.

There has been and continues to be much advancement in snapshot technologies. One example of a very fast and efficient snapshot product is XtremIO® as provided by EMC Corporation of Hopkinton Mass. XtremIO® snapshots allow for large numbers of high performance, low latency, read/writeable snapshots. A snapshot for a backup can be generated in a matter of seconds.

As discussed above, however, a snapshot is merely one piece of the overall backup process. There are many other operations involved in the backup process which can consume a significant amount of time and resources. Thus, despite the advancements in snapshot techniques for backup purposes, there still remains a need to address the other tasks involved in a backup. It would be desirable to have a backup system and technique that allows for frequent backups while also helping to ensure that computing resources are available for other tasks especially during peak operating times.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, Data Domain Boost, and XtremIO are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 4 shows a chart comparing various snapshot services.

FIG. 5 shows an example of a backup object mapping table according to a specific embodiment.

FIG. 6 shows an example of information that may be stored in a backup catalog according to a specific embodiment.

DETAILED DESCRIPTION

Figure 1:
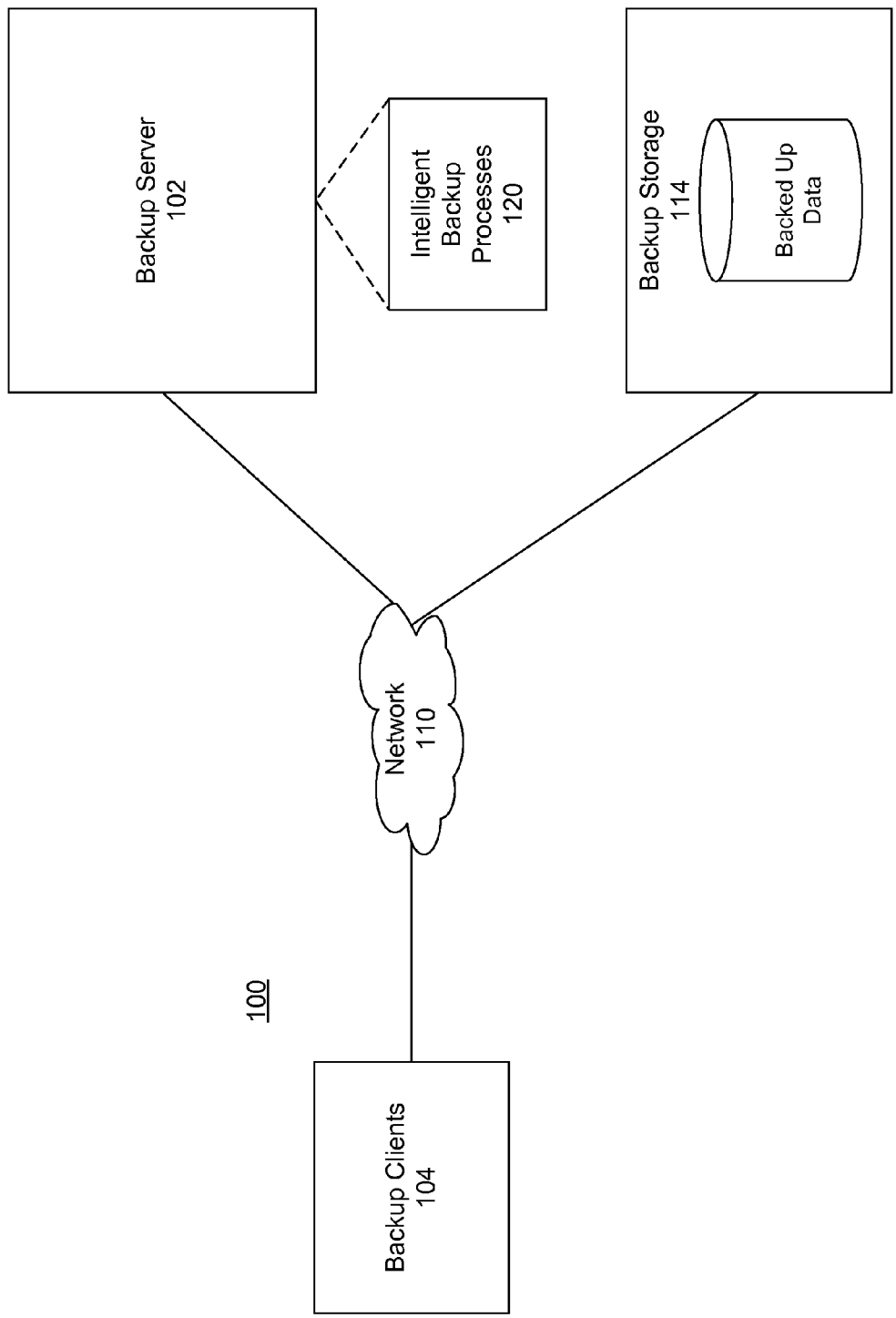
FIG. 1 is a diagram of a large-scale network implementing a data backup and cataloging process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for backing up, cataloging, and restoring data that can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for backing up, cataloging, and restoring data. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media 112 of a backup storage node or unit 114. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 102, one or more backup clients 104, and backup storage 114. The backup server executes processes 120 to intelligently initiate and index or catalog the backups. The backup storage node executes processes for receiving backup information from the backup client, writing data to the backup devices or volumes, sending tracking information to the backup server to track the data written to the devices or volumes, and reading the data from the devices or volumes at the request of the client during a recovery.

In an embodiment, system 100 may represent a Data Domain Replicator (DDR)-based deduplication storage system, and a storage server or node having the backup media may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
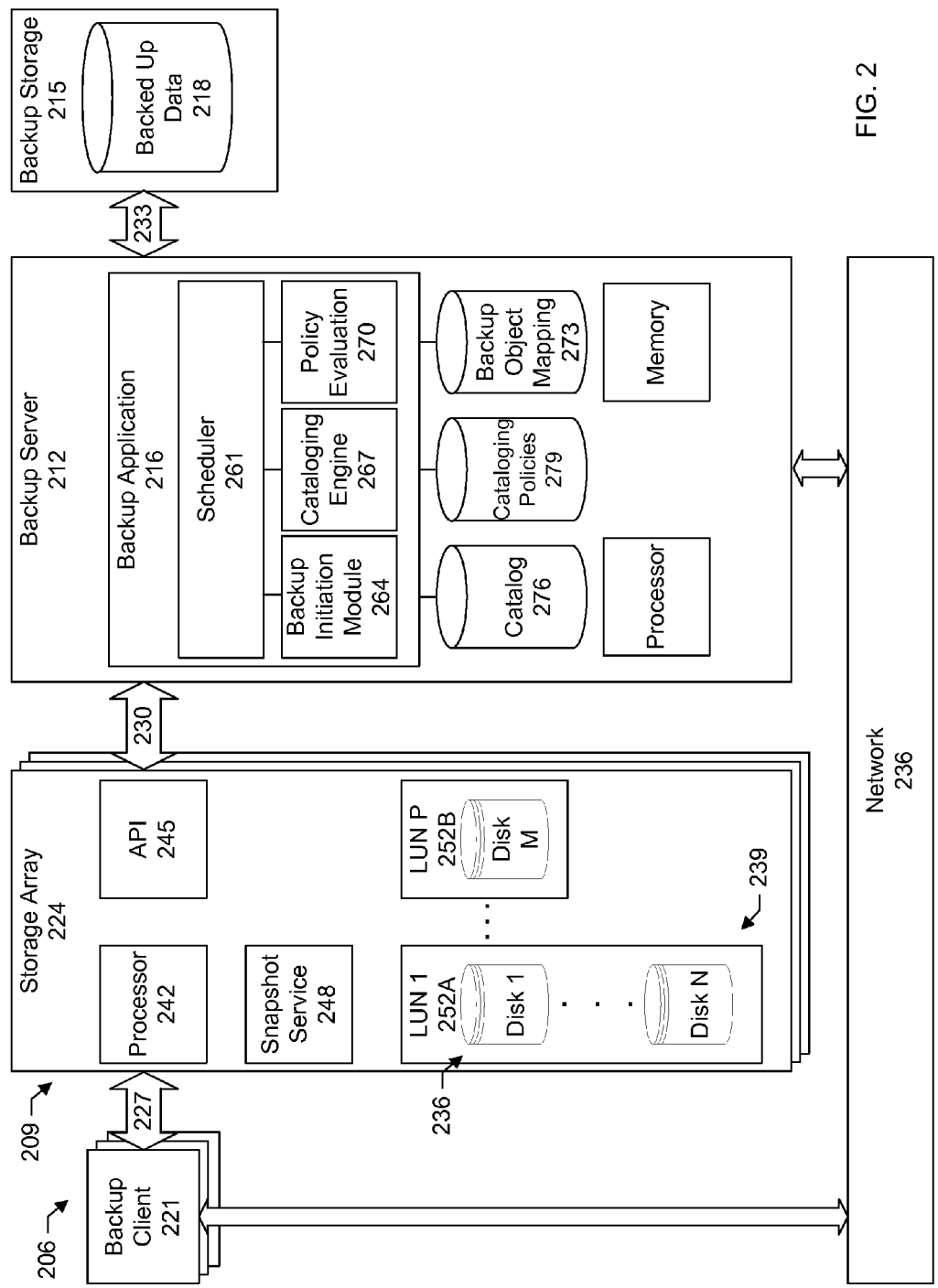
FIG. 2 shows an overall architecture of a system for performing and cataloging a backup according to a specific embodiment.

FIG. 2 shows further detail of a system 203 for intelligently initiating and cataloging a backup. As shown in the example of FIG. 2, this system includes a set of backup clients 206 connected to a set of storage arrays 209. A backup client may be referred to as a host. There is a backup server 212 and a backup storage node 215. The backup server includes a backup application 216. The backup application is responsible for backing up data from the client storage arrays to the backup storage node and for cataloging the backups. Communications between, for example, a backup client 221 and a storage array 224 may be via a bus 227. The backup server may connect to the storage arrays via a bus 230 and to the backup storage node via a bus 233. The backup clients, backup server, and backup storage node may further be connected to a network 236. Buses 227, 230, and 233 may be SCSI or fiber channel buses.

A storage array, such as storage array 224, stores data from a client or backup client. The storage array may include arrays of disks 236 organized into logical unit numbers (LUNs) 239, a processor 242, an application programming interface (API) 245, and a snapshot service 248. In the example shown in FIG. 2, a LUN 252A of the storage array includes disks 1-N 255. A LUN 252B of the storage array includes a disk M 258. A storage array may include any number of disks and any number of LUNs. A LUN is a number or other identifier used to identify a logical storage unit. A disk may be configured as a single LUN (e.g., LUN 236B). A LUN may include multiple (e.g., two or more) disks such as LUN 236. A LUN may include a portion of a disk, portions of multiple disks, or multiple complete disks.

The API allows the storage array exchange communications with the backup application on the backup server. The communications may include receiving and responding to commands or calls from the backup application. The snapshot service on the storage array is responsible for creating a snapshot of the storage array upon request from the backup application. The backup application can then backup data from the snapshot to the backup storage node.

A copy-on-write (COW) is one example of a snapshot service, process, or program. In a COW snapshot, a snapshot of a volume includes an area of space on a disk that may be referred to as "shadow storage." After the snapshot is created a change to any data block from that time forward cannot get written until a copy of that block's data before the change (as it was when the snapshot was created) is written to the differencing area in shadow storage. In this way the data on the disk at the time the snapshot was created is preserved, block by block, in the shadow storage area. The snapshot data is then available either from the original disk, if the data blocks requested have not changed, or from the differencing area if they have.

Another example of a snapshot service or program is XtremIO® from EMC Corporation of Hopkinton, Mass. XtremIO® snapshots are implemented in a unique way that maintains space efficiency on writeable snapshots for both metadata and user data. In combination with XtremIO's unique in-memory metadata architecture, XtremIO® snapshots allow for large numbers of high performance, low latency, read/writeable snapshots. XtremIO® snapshots are efficient in metadata and physical space, can be created instantaneously, have no performance impact, and have the same data services as any other volume in the cluster (for example, thin provisioning and Inline Data Reduction). Other examples of snapshot programs and processes include copy-on-write (COW) as discussed above, redirect-on-write, and full clones. FIG. 4 shows a table that summarizes some snapshot services.

Snapshots can be used for backup purposes. Snapshots can be created very quickly relative to the backing up and cataloging or indexing process. For example, a snapshot may be created in as little as 10 seconds. Depending upon the number, size, or both of the objects to backup a typical backup may require 5 to 15 minutes or more to complete. Cataloging a backup may also require 5 to 15 minutes or more.

As a result, even though snapshots for backups can be created very quickly an organization may decide to perform fewer backups than desirable because of the overall required time. Fewer backups can lead to increased chances of data loss. The heavy processing time during cataloging hinders scalability. There are negative impacts on RPO (Recover Point Objectives) and RTO (Recover Time Objectives) and there are heavy overheads on the backup client, backup server, network, and storage array.

The backup application described herein, however, includes systems and processes to take advantage of high performing snapshots and improve the capability of taking more snapshots, improve RPO, improve RTO, and offload backup processing overheads substantially. Although some embodiments of the system are discussed in conjunction with XtremIO® snapshots, it should be appreciated that aspects and principles of the system can be applied to other snapshot services, programs, processes, or products.

Referring back to FIG. 2, in a specific embodiment, the backup application at the backup server includes a set of modules, components, or code components including a scheduler 261, intelligent backup initiation logic 264, a cataloging engine 267, and a cataloging policy evaluation engine 270. The backup server may further include storage that stores a backup object mapping 273, a catalog 276, and cataloging policies or rules 279.

The backup object mapping stores information mapping an object to be backed up to a LUN of a storage array where the object is located. FIG. 5 shows an example of an object mapping 505. The object mapping may be stored at the backup server. The object mapping includes a first column 510, a second column 515, a third column 520, and a fourth column 525.

In this example of the object mapping table, the first column is labeled "Client name" and stores an identification or name of the backup client or host. The second column is labeled "Client object" and stores an identification of the object to be backed up. A backup object can be any logical grouping of data. For example, an object may include a file system, a folder, a directory, a tablespace (e.g., a logical group of data files in a database), a file, or any unit or multiple units of data. The third column is labeled "Array" and stores an identification of the source storage array associated with the client. The fourth column is labeled "LUN" and stores an identification of the corresponding source LUN (or LUNs) of the source storage array where the object or portions of the object are located.

For example, a first row 530 of the table indicates that backup client "A" includes an object identified as "/FS1" on storage array ID A connected to backup client A. In this example, the object includes a file system. The object is located on LUN number 11 of storage array ID A. As another example, a second row 535 of the table indicates that backup client "B" includes an object identified as "Oracle Tablespace X" on storage array ID B connected to backup client B. In this example, the object includes a tablespace.

The object (or portions of the object) are located on LUNs 111 and 222 of storage array ID B.

Referring back to FIG. 2, catalog 276 stores an index of the backups. The catalog includes metadata associated with the backups. The metadata may include, for example, a time and date of the backup, name of object backed up, source of the backup (e.g., name of backup client, storage array, or LUN), destination of the backup (e.g., device in which the backup is stored or location of the backup media), and so forth. A catalog stores detailed information about a backup. During a restore, a user may browse, access, or view the catalog to determine which backup to restore.

In a specific embodiment, the catalog further stores an indication of whether a particular backup has or has not been cataloged and a set of remarks associated with the cataloging. If the backup has not been cataloged, the corresponding remark indicates the time and date that the backup will be cataloged. If the backup has been cataloged, the corresponding remark indicates the time and date that the backup was cataloged. The information stored in the catalog may be accessed through a graphical user interface (GUI) displayed on an electronic screen so that the user can see backups that have been performed, backups that have been cataloged, the time and date the backups were cataloged, backups that have not been cataloged, and the time and date the backups are to be cataloged.

FIG. 6 shows an example of some information that may be stored in the catalog. As shown in the example of FIG. 6, a table 605 of the catalog may include a first column 610, a second column 615, a third column 620, a fourth column 625, and a fifth column 630. The first column is labeled "Backup time" and stores a timestamp (e.g., time and date) of the backup. The second column is labeled "Backup client name" and stores an identification or name of the backup client or host. The third column is labeled "Backup object" and stores an identification of the object backed up.

The fourth column is labeled "Cataloging Yes/No" and stores an indication or flag indicating whether not the backup has or has not been cataloged. For example, a "yes" value indicates that a corresponding backup has been cataloged. A "no" value indicates that the corresponding backup has not been cataloged. The fifth column is labeled "Remarks" and stores information indicating when the backup is to be cataloged or when the backup was cataloged. The table helps to track the backup snapshots and whether or not the backup has been cataloged.

For example, FIG. 6 shows that a backup 640 has not been cataloged (e.g., cataloging is set to "No"). The remarks corresponding to backup 645 indicate that cataloging is set to occur at 11:30 PM, Friday, Sep. 18, 2015. Similarly, there is a backup 645 that has also not been cataloged. As shown in the corresponding remarks to backup 645, cataloging is set to occur at 11:45 PM, Friday, Sep. 18, 2015. A backup 650, however, has been cataloged (e.g., cataloging is set to "Yes"). The remarks corresponding to backup 650 indicate that backup 650 was cataloged at 10:30 PM, Sunday, Sep. 13, 2015.

A backup process may include 1) setting a scheduler in the backup server; 2) on a particular time, the backup server initiating the backup; 3) the backup server connects with the backup client; 4) a discovery of objects takes place at the client; 4) the client connects with a storage array/API; 5) snapshots are taken on the storage array; and 6) snapshots are cataloged/backed up on the backup server.

This process may be repeated every time a snapshot based backup is required. Though snapshots can be relatively quick (e.g., a few seconds), other processing tasks such as re-discovering backup objects each time a backup is performed and cataloging can require much more time to perform and introduce additional overhead. As a result, many backup applications may be configured to limit the number of backup snapshots made. The system shown in FIG. 2, however, can simplify the workflow. Applicant has recognized that snapshot generation techniques have allowed snapshots to be created faster and faster and that there are other bottlenecks in overall backup processing can be addressed to improve the overall process. In a specific embodiment, the system shown in FIG. 2 helps to reduce the number of connections that are made during the backup process and optimizes or improves the workflows end-to-end.

In a specific embodiment, a policy or rule is passed to the storage arrays. The policy can specify that cataloging a backup is to be postponed to non-peak hours. That is, the system can provide for cataloging only on a periodic cadence which happens in the non-peak hours. In cases where the storage array does not support the storing of cataloging policies or rules, the policies or rules can be stored on the backup server. The backup server can have intelligence or logic that it should initiate the snapshots but not spend time cataloging. This intelligence helps to simplify the workflow and builds efficiency.

In some cases, when a snapshot has to be initiated, the backup server connects to the client and the client connects with the storage array using an appropriate provided API. In a specific embodiment, however, the system shown in FIG. 2 provides intelligent initiation where there is an object mapping stored at the backup server itself. More particularly, in a specific embodiment, there is an object mapping on the backup server which maps the client save sets (backup data) to the storage LUN. A save set refers to a set of source data that is to be backed up. A save set may include a single file or multiple files. The storing of the object mapping on server helps to reduce or eliminate the need to make the connection to the client every time a snapshot is desired. For example, the backup server may include an object mapping in a schema as shown in example of FIG. 5.

This schema can be refreshed periodically or automatically in the event of a change happening on the client. Some examples of changes that may trigger a refresh of the mapping schema include the backup client has been reimaged, a change in the layout of the filesystem or backup object, a disaster recovery of the array or client, a migration of the array or client, or in some cases reboots of the array or client, or combinations of these.

In another specific embodiment, the system shown in FIG. 2 provides for intelligent cataloging. Intelligent cataloging refers to a process where instead of cataloging every single backup at the time of backup, the backup server will connect to the storage array on non-peak hours or times to complete the cataloging. This saves significant time which allows the backup application to take many more snapshots which otherwise would not have been possible. In a specific embodiment, there is a policy or rule configured on the storage array (policy/configurations) if the storage array allows for such a policy or rule. Alternatively, the backup server may include the intelligence or policy that manages generating snapshots and postponing cataloging for later (e.g., snapshots_only). Postponing cataloging helps to save processing time enabling the backup application to take more snapshots as the actual cataloging can take place or occurring in non-peak times when the infrastructure is not as loaded as compared to peak times.

In a specific embodiment, a scheduler of the backup application is provided or can be configured with a set of policies or rules. There can be a first policy referred to as "snapshots only" in which cataloging is scheduled for non-peak times. There can be second policy referred to as "snapshot cataloging" in which each snapshot, or more specifically each backup from a snapshot, is immediately accompanied by cataloging the backup. For example, in some cases a user may prefer to perform cataloging in conjunction with a backup rather than postponing the cataloging operation. Thus, a backup may be cataloged before a next backup is performed. Alternatively, a backup may be cataloged after a next or multiple backups are performed. The system is flexible and can accommodate the desires of different users.

Specifically, scheduler 261 of the backup application is responsible for initiating backups via backup initiation module 264 and cataloging the backups via cataloging engine 267. In a specific embodiment, when the scheduler determines that a backup of a storage array of a client is required, the backup initiation module accesses the backup object mapping to identify the objects on the storage array that should be backed up and their locations on the storage array. The backup application connects to the storage array via the storage array API and requests a snapshot of the storage array. The backup application can then backup the identified backup objects from the storage array snapshot to backup storage. A backup can be completed without the backup server having to connect to the backup client and without having to discover or re-discover the objects to be backed up.

Figure 7:
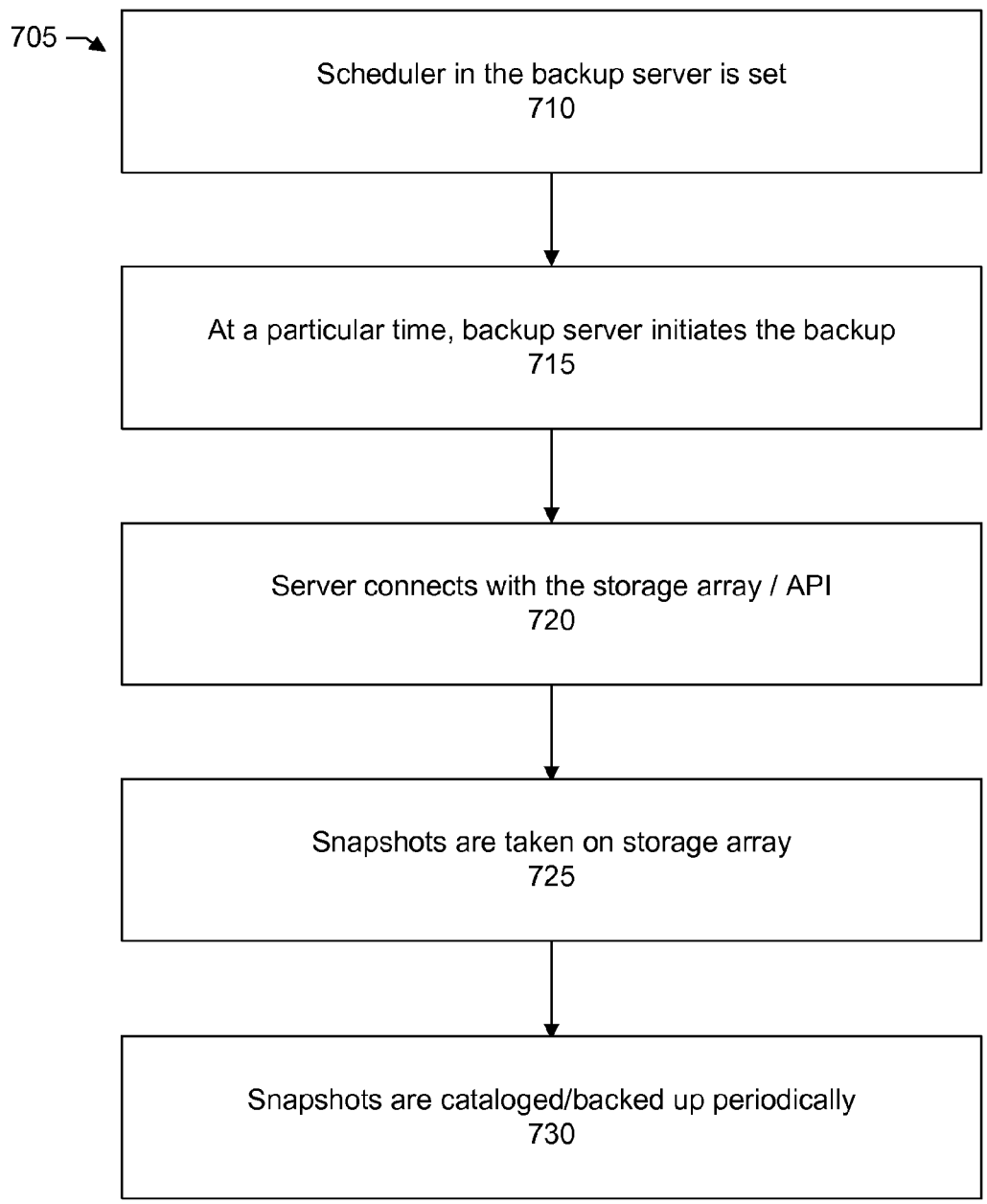
FIG. 7 shows a block diagram of an overall flow of the system according to a specific embodiment.

FIG. 7 shows an overall flow 705 of a backup process according to a specific embodiment. In brief, in a step 710, the scheduler in the backup server is set. In a step 715, on or at a particular scheduled time, the backup server initiates the backup. In a step 720, the backup server connects with the storage array via an API. In a step 725, snapshots are taken on the storage array. For example, the backup application may issue to a snapshot service on the storage array a request to create a snapshot of the storage array. In a step 730, snapshots are cataloged/backed up periodically. For example, the backup application may backup data from the snapshot to backup storage. In some cases, cataloging the backup is postponed for later. In other cases, the backup is cataloged immediately.

Figure 8:
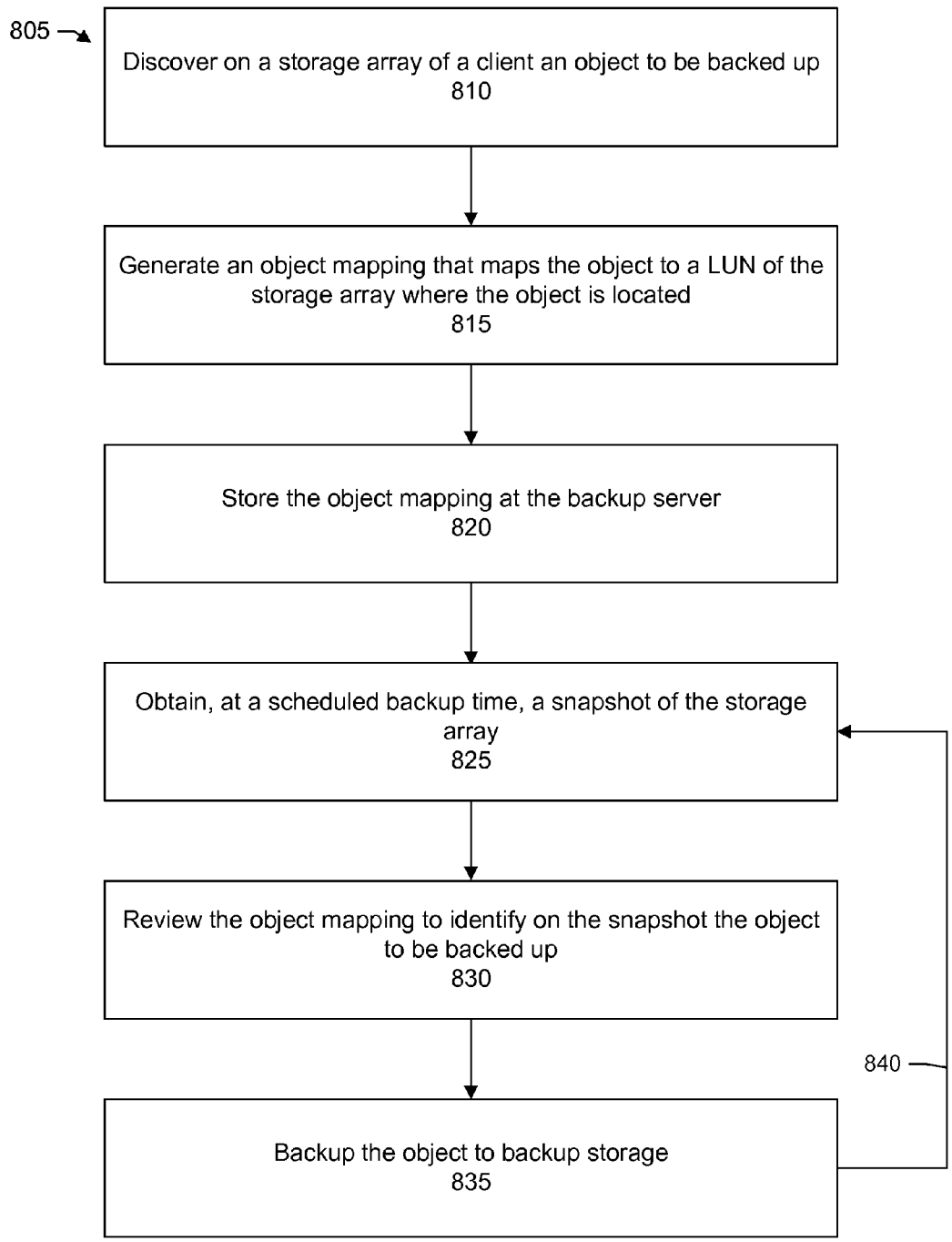
FIG. 8 shows a more detailed flow of a backup according to a specific embodiment.

FIG. 8 shows a more detailed flow 805 of backing up according to a specific embodiment. In a step 810, the backup application discovers on a storage array of a client an object to be backed up. The discovery process may include, for example, receiving from a user an identification or name of an object to be backed up, connecting to a backup client, and accessing or scanning one or more storage arrays associated with the backup client to locate the object. The discovery may include communicating with a storage array management utility to obtain, for example, the path location of the object, files associated with the object, the path location of the associated files, and other attributes or properties associated with the object.

In a step 815, based on the results of the discovery, the backup application generates an object mapping that maps the object to be backed up to a LUN of the storage array where the object is located. In a step 820, the backup application stores the object mapping at the backup server. As discussed above, FIG. 5 shows an example of an object mapping that may be generated and stored in a database at the backup server.

In a step 825, at the scheduled time to perform a backup, the backup application obtains a snapshot of the storage array. For example, the backup application may use the stored object mapping to identify the storage array to connect to. The backup application (or backup server) may connect with the storage array via an API of the storage array. The connection to the storage array may be performed without connecting to the client associated with the storage array. In this specific embodiment, the backup server, rather than connecting to the backup client which in turn connects to the storage array, the backup server can connect directly to the storage array.

In a step 830, the backup application reviews the object mapping to identify on the snapshot the object to be backed up. For example, as shown in FIG. 5, row 530 of the object mapping indicates that there is an object "/FS1" on storage array ID A in LUN 11 that should be backed up. The backup application, using the LUN ID, can locate and backup the object to backup storage (step 835). The object mapping can map the file system of the object on the client to the corresponding LUN ID on the storage array.

Process steps 825-835 can be repeated 840 for a subsequent or next backup. More particularly, the stored object mapping at the backup server allows a next backup to be performed without having to discover or re-discover the objects to be backed up. The backup application at the backup server will not have to reconnect to the backup client and perform another discovery for the next backup. At the time of the next backup, the backup application can access, read, or consult the object mapping that is stored and maintained at the backup server to identify which objects should be backed up and their location. Reducing the hops to the client and rediscovery process helps to reduce the overall time to complete a backup.

In some cases, the object mapping used for a next backup is the same object mapping used for a previous backup. In other case, the object mapping used for the next backup may be an updated version of the object mapping. In a specific embodiment, the object mapping is refreshed periodically. For example, the object mapping may be refreshed daily during non-peak hours or at any other time or frequency as desired. Refreshing or updating the object mapping may include conducting another discovery. Refreshing the object mapping helps to ensure that any events or changes happening with the client that might affect the backup of the object are properly reflected in the object mapping. Events or changes that might affect the backup may include, for example, moving, relocating, or migrating the object to a different storage array or LUN.

In a specific embodiment, the object mapping may be refreshed on-demand such as upon a request by a user. In another specific embodiment, the object mapping may be refreshed based upon a triggering event at the backup client, storage array, or both. For example, there can be an agent installed at the backup client, storage array, or both that detects changes. Such changes may include, for example, a relocation of the backup object, a configuration change of the client, a configuration change of the storage array, or combinations of these. The agent, upon detecting such a change, can send a notification to the backup application on the backup server. Upon receipt of the notification, the backup application may conduct a new discovery and update or refresh the backup object mapping based on the new discovery.

Referring back to FIG. 2, scheduler 261 of the backup application is further responsible for initiating cataloging of a backup via cataloging engine 267. A determination of when to catalog is based on an evaluation of a cataloging policy by policy evaluation module 270.

In a specific embodiment, a cataloging policy specifies whether a cataloging of a backup is to be postponed to non-peak hours or times. A user or administrator may define, for example, non-peak times to be late evening and early morning times (e.g., 10:00 PM to 3:00 AM), weekends (e.g., Saturdays or Sundays), or any other time period, days, or both as desired. Generally, the user sets the non-peak times to correspond to a time, day, or both when computing loads are expected to be relatively light. Peak hours or times maybe defined as time periods outside non-peak times. For example, peak times maybe defined as weekdays (e.g., Mondays, Tuesdays, Wednesdays, Thursdays, and Fridays) and non-peak times may be defined as weekends (e.g., Saturdays and Sundays).

A cataloging policy may be associated at a system level, backup client level, storage array level, or backup object level. A cataloging policy may be associated with a particular backup client, a particular storage array of a backup client, or a particular backup object. For example, a first cataloging policy may be associated with a first storage array. The first cataloging policy may specify a serial number or GUID of the first storage array. A second cataloging policy, different from the first cataloging policy, may be associated with a second storage array. The second cataloging policy may specify a serial number or GUID of the second storage array.

The first cataloging policy may specify that cataloging should be performed in conjunction with each backup. That is, the policy may indicate that cataloging is not to be postponed. The second cataloging policy may specify that cataloging should be postponed to non-peak times. Thus, a backup of the first and second storage arrays during peak times may result in the immediate cataloging of the backup for the first storage array during the peak times and a delayed cataloging of the backup for the second storage array to the non-peak times.

Associating a cataloging policy at the level of a backup object provides very granular control over the cataloging process as compared to associating at a higher level such as at the system level or client level. However, there can also be many more policies to manage as compared to associating a cataloging policy at a higher level. The system is flexible and allows organizations to decide the level at which to associate cataloging policies. For example, some organization may decide to have a system level cataloging policy. In this specific embodiment, all backups are (or are not) postponed to non-peak times. Other organizations may decide to have storage array level cataloging policies. In this specific embodiment, some backups of some storage arrays will be cataloged immediately, regardless of whether or not the backups occur during peak or non-peak times. Other backups of other storage arrays, however, will not be cataloged until the non-peak times.

In a specific embodiment, cataloging policies are stored in catalog policy repository 279 on the backup server. This catalog repository may include cataloging policies for any number of different storage arrays, backup clients, or backup objects.

Different cataloging policies may have different definitions of non-peak times. For example, a first cataloging policy may define non-peak times as being between 11:00 PM and 2:00 AM on weekdays. A second cataloging policy may define non-peak times as being on Saturdays and Sundays. This allows the system to have very fine-grained control over when a backup is or is not cataloged.

Figure 3:
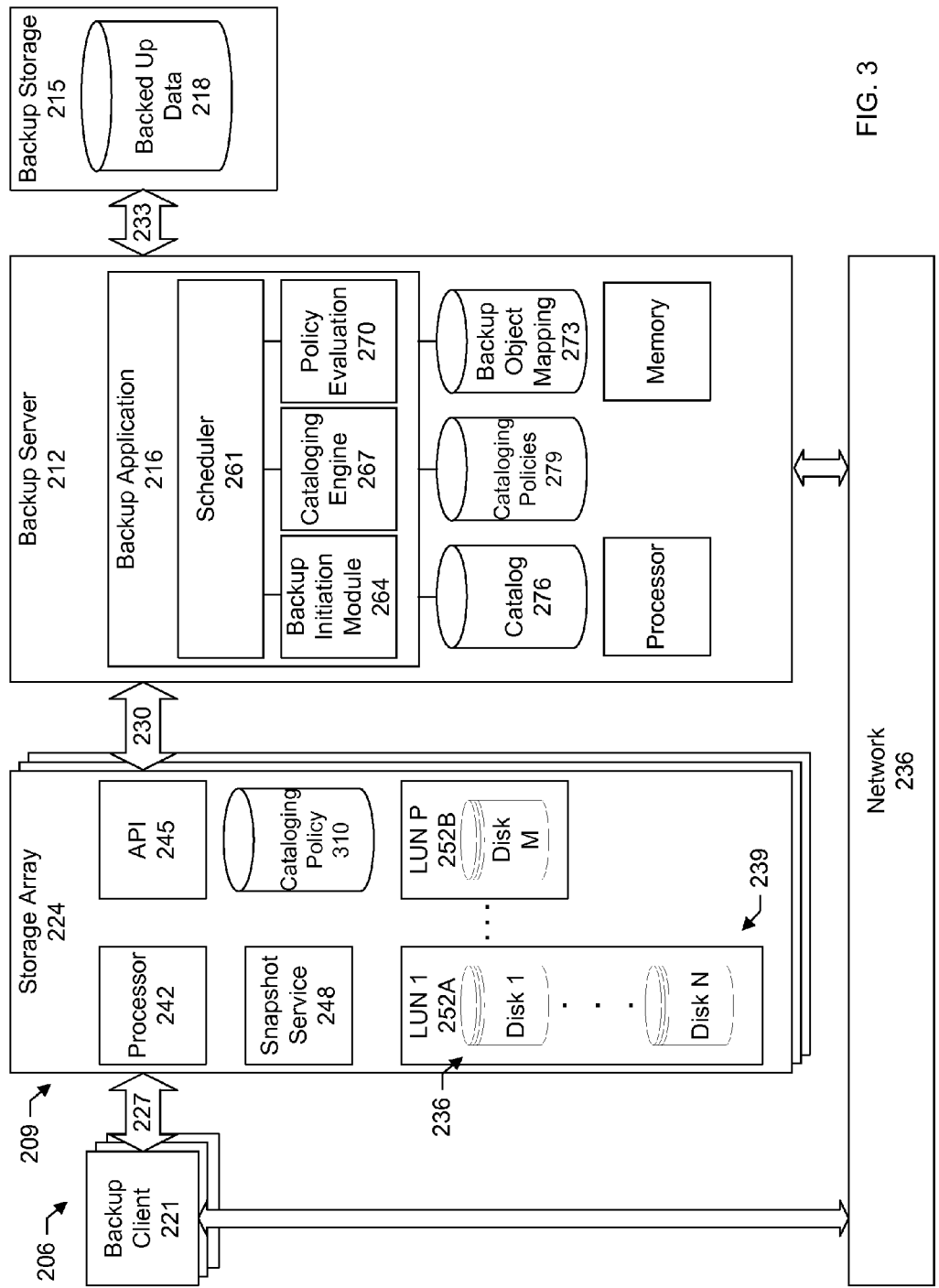
FIG. 3 shows an overall architecture of a system for performing and cataloging a backup according to another specific embodiment.

In a specific embodiment, a cataloging policy is stored on a storage array itself. For example, FIG. 3 shows an example of another specific embodiment of the system. FIG. 3 is similar to FIG. 2. In FIG. 3, however, storage array 224 includes a catalog repository 310 that stores a cataloging policy associated with storage array 224. In this specific embodiment, the backup application may connect to storage array 224 to evaluate the cataloging policy associated with the storage array.

For example, the cataloging policy may be transmitted from the storage array to the backup server for evaluation. Based on the evaluation of the cataloging policy, the backup application may perform an immediate cataloging of backups associated with the storage array or may postpone the cataloging to non-peak times as defined in the received cataloging policy. Storing a cataloging policy at the storage array can help to conserve storage space on the backup server. However, in some cases, a storage array may not allow for the storage of such policies or may not be configured to store such policies. In these cases, the cataloging policy may be stored at the backup server.

A system may include a combination of storage arrays in which some storage arrays support storing cataloging polices and other storage arrays do not support storing cataloging policies. Thus, there can be a first storage array, a second storage array, and a backup server. The first storage array may store a first cataloging policy, the first storage array thereby having support for storing cataloging polices. The second storage array may not store any cataloging policies, the second storage array thereby not having support for storing cataloging policies. The backup server may store a second cataloging policy for the second storage array. In a specific embodiment, the backup server does not store the first cataloging policy since the first cataloging policy is stored at the first storage array. This helps to conserve storage space on the backup server. Alternatively, the backup server may store a copy of the first cataloging policy to help provide redundancy.

In a specific embodiment, when a storage array supports storing cataloging policies, only cataloging policies relevant to that storage array may be stored on that storage array. Cataloging policies not relevant to that storage array may not be stored on that storage array. Not storing cataloging policies on the storage array that will not be used or evaluated helps to conserve storage space on the storage array. For example, a first cataloging policy may be stored on a first storage array. A second cataloging policy, different from the first cataloging policy, may be stored on a second storage array. The second cataloging policy may not be relevant to the first storage array and may not be stored on the first storage array. Likewise, the first cataloging policy may not be relevant to the second storage array and may not be stored on the second storage array.

Figure 9:
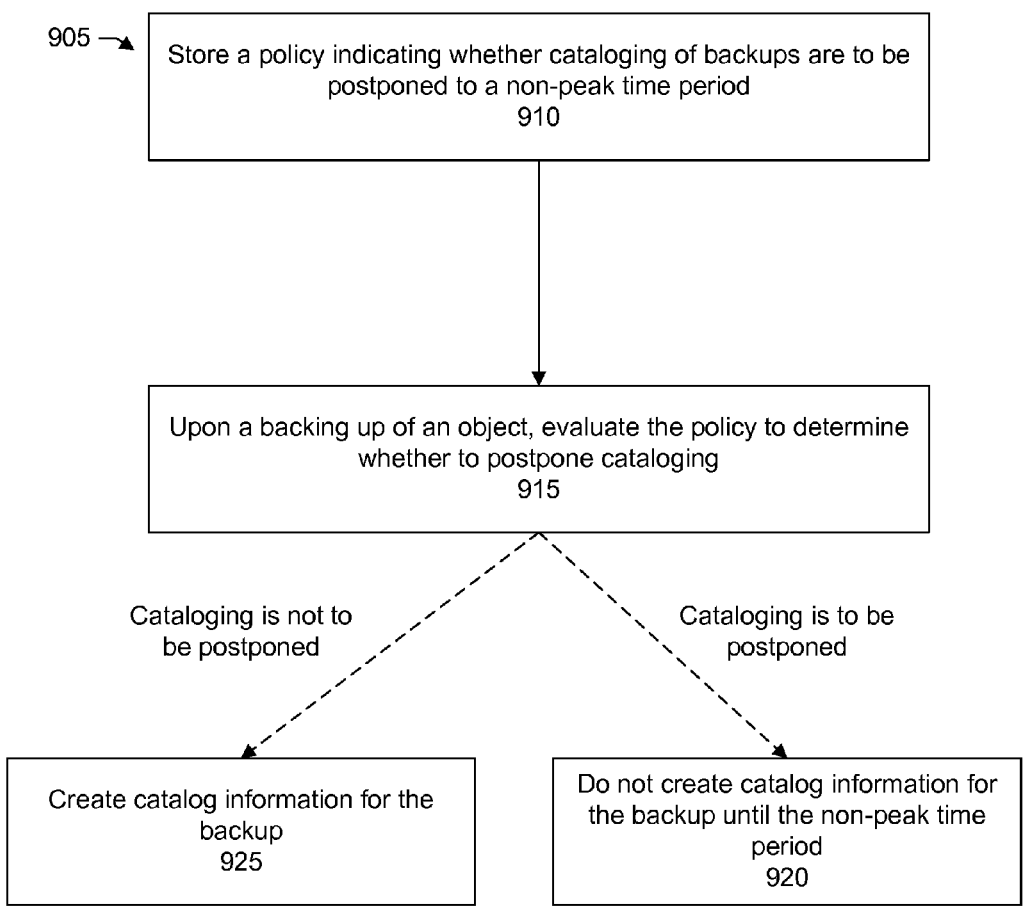
FIG. 9 shows a flow for determining whether or when to catalog a backup based on a cataloging policy according to a specific embodiment.

FIG. 9 shows an overall flow 905 of cataloging. In a step 910, a cataloging policy is stored. The cataloging policy indicates whether cataloging of backups are to be postponed to a non-peak time period. In a step 915, upon a backing up of an object on a storage array of a backup client, the cataloging policy is evaluated to determine whether or not to postpone the cataloging of the backup.

Consider, as an example, that the cataloging policy specifies that cataloging is to be postponed to a non-peak time period. In this specific embodiment, the policy evaluation module of the backup application compares a current time of a backup to a non-peak time period as defined in the cataloging policy. If the current time of the backup does not correspond to the non-peak time period, the backup application postpones cataloging until the non-peak time period (e.g., step 920). For example, cataloging may be postponed if the current time of the backup falls outside the non-peak time period.

Alternatively, if the current time of the backup corresponds to the non-peak time period, the backup application performs a cataloging of the backup (e.g., step 925). For example, cataloging may be performed when the current time of the backup falls within the non-peak time period as defined in the cataloging policy.

In a specific embodiment, a cataloging policy, rather than specifying a time period when cataloging is allowed to be performed, may instead specify a time period in which cataloging is not allowed to be performed. For example, in this specific embodiment, if a current time of a backup corresponds to a defined time period in which cataloging is not allowed, the backup will not be cataloged until a time falls outside of the defined time period of the cataloging policy. Conversely, if the current time of the backup falls outside of the defined time period in which cataloging is not allowed, the backup is cataloged.

In a specific embodiment, creating cataloging information may include accessing or connecting to the storage array to gather metadata associated with one or more backups of the storage array. For example, the storage array may maintain a log or other file that details the time and date that a snapshot backup of the storage array was performed. The storage array may maintain a journaling mechanism such as database or log or other file that details the time and date that a snapshot backup of the storage array was performed. The backup application can examine the log and collect information about the various backups that have been performed. The backup application can use the collected information to create or insert an entry or record in the backup catalog that details the backup. The cataloging information may include the time and date of the backup, source location of the object that was backed up (e.g., name of backup client, storage array, and LUN), destination location that the object was backed up to (e.g., an identification of a backup volume on which the object is stored), and so forth.

In a specific embodiment, when cataloging is to be postponed, a cataloging of a backup may not occur at a time of the backup. A backup from a snapshot may be unaccompanied by cataloging. Rather, the cataloging may occur at a later scheduled time (i.e., at a time after the time of the backup). At the later time, the backup application at the backup server connects to the storage array to catalog a backup of the storage array that was previously performed.

Figure 10:
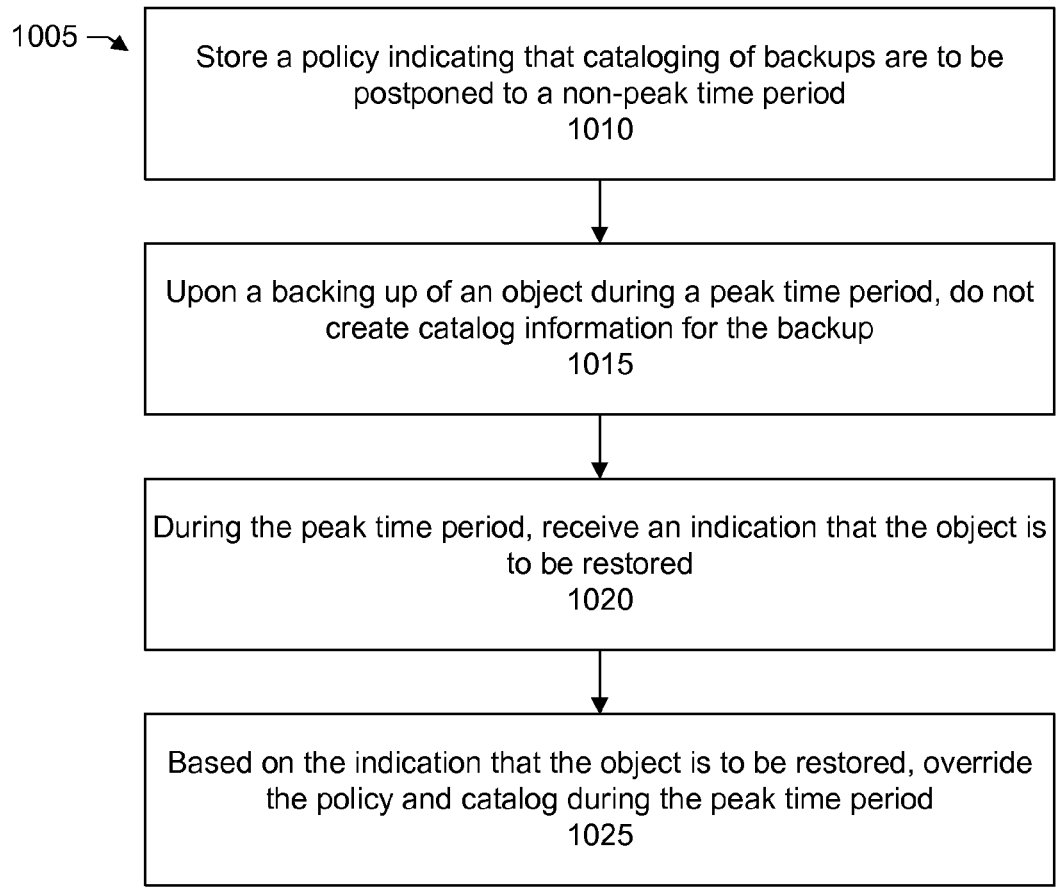
FIG. 10 shows a flow for overriding a cataloging policy according to a specific embodiment.

FIG. 10 shows a flow 1005 for overriding a cataloging policy. In a step 1010, there is a cataloging policy that specifies cataloging of backups is to be postponed to a non-peak time period. In a step 1015, upon a backing up of an object during a peak time period, cataloging information is not created for the backup based on cataloging policy.

In a step 1020, during the peak time period, the backup application receives an indication that the object is to be restored. The backup application may review the catalog and determine that the backup has not been cataloged. Consider, as an example, that the backup application receives a request from the user to restore backup object "/FS1." The backup application can review the catalog table as shown in FIG. 6 and, based on the corresponding entries for backup object "/FS1" in row 640, determine that the object has not been cataloged (e.g., "Cataloging" is set to "No").

In a step 1025, based on the indication that the object is to be restored, the backup application may override the policy and catalog one or more backups of the backup object (e.g., "/FS1") during the peak time period.

Overriding the cataloging policy upon an indication of a restore helps to ensure that the user is provided with up-to-date cataloging information associated with the backed up object to be restored. An object may have been backed up multiple times and thus may be associated with multiple (e.g., two or more backups).

For example, an organization may schedule backups to be performed hourly each day, but may configure a cataloging policy that specifies cataloging during non-peak time periods (e.g., Sundays between 10:30 PM and 2:00 AM). As a result, there can be multiple backups of the object where each of the multiple backups has not been cataloged. For example, if the current day is a Thursday, there may be backups from Monday, Tuesday, and Wednesday that have not been cataloged. Overriding the cataloging policy allows cataloging information to be created for each of these backups. The user can then review the updated backup catalog to decide which backup to restore.

In a specific embodiment, a method includes discovering a first object to be backed up on a first storage array of a first client; based on the discovery, generating an object mapping that maps the first object to a first logical unit number (LUN) of the first storage array where the first object is located; storing the object mapping at a backup server; obtaining a first snapshot of the first storage array; reviewing the object mapping to identify on the first snapshot of the first storage array the first object to be backed up; and backing up the first object to a backup storage unit.

The method may include storing a policy indicating whether cataloging of backups are to be postponed to a non-peak time period; upon the backing up the first object, evaluating the policy to determine whether to postpone cataloging; if the cataloging is not to be postponed, creating cataloging information for the backing up; and if the cataloging is to be postponed, not creating the cataloging information until the non-peak time period.

The object mapping may include a name of the first client, a name of the first object to be backed up, an identifier of the first storage array, and an identifier of the first LUN.

The method may include storing a first policy indicating that cataloging of backups associated with the first client are to be postponed to a non-peak time period; storing a second policy indicating that cataloging of backups associated with a second client are not to be postponed; upon the backing up of the first object, postponing, based on the first policy, creating cataloging information for the backing up of the first object to the non-peak time period; backing up a second object associated with the second client; and upon the backing up of the second object, not postponing, based on the second policy, creating cataloging information for the backing up of the second object.

The method may include discovering a second object to be backed up on a second storage array of a second client, different from the first client; updating the object mapping to map the second object to a second LUN of the second storage array where the second object is located; obtaining a second snapshot of the second storage array; without repeating the discovering a second object, reviewing the updated object mapping to identify on the second snapshot of the second storage array the second object to be backed up; and backing up the second object to the backup storage unit.

The method may include storing a policy indicating that cataloging of backups are to be postponed to a non-peak time period; upon the backing up the first object, not creating cataloging information for the backing up of the first object because a time of the backing up corresponds to a peak time period; after the not creating cataloging information, receiving during the peak time period an indication that the first object is to be restored; and based on the indication that the first object is to be restored, creating during the peak time period the cataloging information for the backing up of the first object, thereby overriding the policy.

In another specific embodiment, there is a system including a processor-based system executed on a computer system and configured to: discover a first object to be backed up on a first storage array of a first client; based on the discovery, generate an object mapping that maps the first object to a first logical unit number (LUN) of the first storage array where the first object is located; store the object mapping at a backup server; obtain a first snapshot of the first storage array; review the object mapping to identify on the first snapshot of the first storage array the first object to be backed up; and backup the first object to a backup storage unit.

In another specific embodiment, there is a computer program product, including a non-transitory computer-readable medium having a computer-readable program code embodied therein, the computer-readable program code adapted to be executed by one or more processors to implement a method including discovering a first object to be backed up on a first storage array of a first client; based on the discovery, generating an object mapping that maps the first object to a first logical unit number (LUN) of the first storage array where the first object is located; storing the object mapping at a backup server; obtaining a first snapshot of the first storage array; reviewing the object mapping to identify on the first snapshot of the first storage array the first object to be backed up; and backing up the first object to a backup storage unit.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    discovering a first object to be backed up on a first storage array of a first client;
    based on the discovery, generating an object mapping that maps the first object to a first logical unit number (LUN) of the first storage array where the first object is located;
    storing the object mapping at a backup server;
    obtaining a first snapshot of the first storage array;
    reviewing the object mapping to identify on the first snapshot of the first storage array the first object to be backed up;
    backing up the first object to a backup storage unit;
    storing a policy indicating whether cataloging of backups are to be postponed to a non-peak time period;
    upon the backing up the first object, evaluating the policy to determine whether to postpone cataloging;
    if the cataloging is not to be postponed, creating cataloging information for the backing up; and
    if the cataloging is to be postponed, not creating the cataloging information until the non-peak time period.

2. The method of claim 1 wherein the object mapping comprises a name of the first client, a name of the first object to be backed up, an identifier of the first storage array, and an identifier of the first LUN.

3. A method comprising:
    discovering a first object to be backed up on a first storage array of a first client;
    based on the discovery, generating an object mapping that maps the first object to a first logical unit number (LUN) of the first storage array where the first object is located;
    storing the object mapping at a backup server;
    obtaining a first snapshot of the first storage array;
    reviewing the object mapping to identify on the first snapshot of the first storage array the first object to be backed up;
    backing up the first object to a backup storage unit;
    storing a first policy indicating that cataloging of backups associated with the first client are to be postponed to a non-peak time period;
    storing a second policy indicating that cataloging of backups associated with a second client are not to be postponed;
    upon the backing up of the first object, postponing, based on the first policy, creating cataloging information for the backing up of the first object to the non-peak time period;
    backing up a second object associated with the second client; and
    upon the backing up of the second object, not postponing, based on the second policy, creating cataloging information for the backing up of the second object.

4. A method comprising:
    discovering a first object to be backed up on a first storage array of a first client;
    based on the discovery, generating an object mapping that maps the first object to a first logical unit number (LUN) of the first storage array where the first object is located;
    storing the object mapping at a backup server;
    obtaining a first snapshot of the first storage array;
    reviewing the object mapping to identify on the first snapshot of the first storage array the first object to be backed up;
    backing up the first object to a backup storage unit;
    discovering a second object to be backed up on a second storage array of a second client, different from the first client;
    updating the object mapping to map the second object to a second LUN of the second storage array where the second object is located;
    obtaining a second snapshot of the second storage array;
    without repeating the discovering a second object, reviewing the updated object mapping to identify on the second snapshot of the second storage array the second object to be backed up; and
    backing up the second object to the backup storage unit.

5. A method comprising:
discovering a first object to be backed up on a first storage array of a first client;
based on the discovery, generating an object mapping that maps the first object to a first logical unit number (LUN) of the first storage array where the first object is located;
storing the object mapping at a backup server;
obtaining a first snapshot of the first storage array;
reviewing the object mapping to identify on the first snapshot of the first storage array the first object to be backed up;
backing up the first object to a backup storage unit;
storing a policy indicating that cataloging of backups are to be postponed to a non-peak time period;
upon the backing up the first object, not creating cataloging information for the backing up of the first object because a time of the backing up corresponds to a peak time period;
after the not creating cataloging information, receiving during the peak time period an indication that the first object is to be restored; and
based on the indication that the first object is to be restored, creating during the peak time period the cataloging information for the backing up of the first object, thereby overriding the policy.

6. A system comprising:
a processor-based system executed on a computer system and configured to:
discover a first object to be backed up on a first storage array of a first client;
based on the discovery, generate an object mapping that maps the first object to a first logical unit number (LUN) of the first storage array where the first object is located;
store the object mapping at a backup server;
obtain a first snapshot of the first storage array;
review the object mapping to identify on the first snapshot of the first storage array the first object to be backed up;
backup the first object to a backup storage unit;
store a policy indicating whether cataloging of backups are to be postponed to a non-peak time period;
upon the backup of the first object, evaluate the policy to determine whether to postpone cataloging;
if the cataloging is not to be postponed, create cataloging information for the backing up; and
if the cataloging is to be postponed, not create the cataloging information until the non-peak time period.

7. The system of claim 6 wherein the object mapping comprises a name of the first client, a name of the first object to be backed up, an identifier of the first storage array, and an identifier of the first LUN.

8. A system comprising:
a processor-based system executed on a computer system and configured to:
discover a first object to be backed up on a first storage array of a first client;
based on the discovery, generate an object mapping that maps the first object to a first logical unit number (LUN) of the first storage array where the first object is located;
store the object mapping at a backup server;
obtain a first snapshot of the first storage array;
review the object mapping to identify on the first snapshot of the first storage array the first object to be backed up;
backup the first object to a backup storage unit;
store a first policy indicating that cataloging of backups associated with the first client are to be postponed to a non-peak time period;
store a second policy indicating that cataloging of backups associated with a second client are not to be postponed;
upon the backup of the first object, postpone, based on the first policy, creating cataloging information for the backing up of the first object to the non-peak time period;
backup a second object associated with the second client; and
upon the backup of the second object, not postpone, based on the second policy, creating cataloging information for the backing up of the second object.

9. A system comprising:
a processor-based system executed on a computer system and configured to:
discover a first object to be backed up on a first storage array of a first client;
based on the discovery, generate an object mapping that maps the first object to a first logical unit number (LUN) of the first storage array where the first object is located;
store the object mapping at a backup server;
obtain a first snapshot of the first storage array;
review the object mapping to identify on the first snapshot of the first storage array the first object to be backed up;
backup the first object to a backup storage unit;
discover a second object to be backed up on a second storage array of a second client, different from the first client;
update the object mapping to map the second object to a second LUN of the second storage array where the second object is located;
obtain a second snapshot of the second storage array;
without repeating the discovery, review the updated object mapping to identify on the second snapshot of the second storage array the second object to be backed up; and
backup the second object to the backup storage unit.

10. A system comprising:
a processor-based system executed on a computer system and configured to:
discover a first object to be backed up on a first storage array of a first client;
based on the discovery, generate an object mapping that maps the first object to a first logical unit number (LUN) of the first storage array where the first object is located;
store the object mapping at a backup server;
obtain a first snapshot of the first storage array;
review the object mapping to identify on the first snapshot of the first storage array the first object to be backed up;
backup the first object to a backup storage unit;
store a policy indicating that cataloging of backups are to be postponed to a non-peak time period;
upon the backup of the first object, not create cataloging information for the backing up of the first object because a time of the backing up corresponds to a peak time period;
after the not creating cataloging information, receive during the peak time period an indication that the first object is to be restored; and
based on the indication that the first object is to be restored, create during the peak time period the cataloging information for the backup of the first object, thereby overriding the policy.

11. A computer program product, comprising a non-transitory computer-readable medium having a computer-readable program code embodied therein, the computer-readable program code adapted to be executed by one or more processors to implement a method comprising:
 discovering a first object to be backed up on a first storage array of a first client;
 based on the discovery, generating an object mapping that maps the first object to a first logical unit number (LUN) of the first storage array where the first object is located;
 storing the object mapping at a backup server;
 obtaining a first snapshot of the first storage array;
 reviewing the object mapping to identify on the first snapshot of the first storage array the first object to be backed up;
 backing up the first object to a backup storage unit;
 storing a policy indicating whether cataloging of backups are to be postponed to a non-peak time period;
 upon the backing up the first object, evaluating the policy to determine whether to postpone cataloging;
 if the cataloging is not to be postponed, creating cataloging information for the backing up; and
 if the cataloging is to be postponed, not creating the cataloging information until the non-peak time period.

12. The computer program product of claim 11 wherein the object mapping comprises a name of the first client, a name of the first object to be backed up, an identifier of the first storage array, and an identifier of the first LUN.

13. A computer program product, comprising a non-transitory computer-readable medium having a computer-readable program code embodied therein, the computer-readable program code adapted to be executed by one or more processors to implement a method comprising:
 discovering a first object to be backed up on a first storage array of a first client;
 based on the discovery, generating an object mapping that maps the first object to a first logical unit number (LUN) of the first storage array where the first object is located;
 storing the object mapping at a backup server;
 obtaining a first snapshot of the first storage array;
 reviewing the object mapping to identify on the first snapshot of the first storage array the first object to be backed up;
 backing up the first object to a backup storage unit;
 storing a first policy indicating that cataloging of backups associated with the first client are to be postponed to a non-peak time period;
 storing a second policy indicating that cataloging of backups associated with a second client are not to be postponed;
 upon the backing up of the first object, postponing, based on the first policy, creating cataloging information for the backing up of the first object to the non-peak time period;
 backing up a second object associated with the second client; and
 upon the backing up of the second object, not postponing, based on the second policy, creating cataloging information for the backing up of the second object.

14. A computer program product, comprising a non-transitory computer-readable medium having a computer-readable program code embodied therein, the computer-readable program code adapted to be executed by one or more processors to implement a method comprising:
 discovering a first object to be backed up on a first storage array of a first client;
 based on the discovery, generating an object mapping that maps the first object to a first logical unit number (LUN) of the first storage array where the first object is located;
 storing the object mapping at a backup server;
 obtaining a first snapshot of the first storage array;
 reviewing the object mapping to identify on the first snapshot of the first storage array the first object to be backed up;
 backing up the first object to a backup storage unit;
 discovering a second object to be backed up on a second storage array of a second client, different from the first client;
 updating the object mapping to map the second object to a second LUN of the second storage array where the second object is located;
 obtaining a second snapshot of the second storage array;
 without repeating the discovering a second object, reviewing the updated object mapping to identify on the second snapshot of the second storage array the second object to be backed up; and
 backing up the second object to the backup storage unit.

15. A computer program product, comprising a non-transitory computer-readable medium having a computer-readable program code embodied therein, the computer-readable program code adapted to be executed by one or more processors to implement a method comprising:
 discovering a first object to be backed up on a first storage array of a first client;
 based on the discovery, generating an object mapping that maps the first object to a first logical unit number (LUN) of the first storage array where the first object is located;
 storing the object mapping at a backup server;
 obtaining a first snapshot of the first storage array;
 reviewing the object mapping to identify on the first snapshot of the first storage array the first object to be backed up;
 backing up the first object to a backup storage unit;
 storing a policy indicating that cataloging of backups are to be postponed to a non-peak time period;
 upon the backing up the first object, not creating cataloging information for the backing up of the first object because a time of the backing up corresponds to a peak time period;
 after the not creating cataloging information, receiving during the peak time period an indication that the first object is to be restored; and
 based on the indication that the first object is to be restored, creating during the peak time period the cataloging information for the backing up of the first object, thereby overriding the policy.

\* \* \* \* \*